United States Patent [19]

Keedwell

[11] 4,033,371

[45] July 5, 1977

[54] PROPORTIONING VALVE FOR VOLUMETRIC PROPORTIONING OF FLOW

[75] Inventor: Cyril A. Keedwell, Lovedean, England

[73] Assignee: Pall Corporation, Glen Cove, N.Y.

[22] Filed: June 24, 1976

[21] Appl. No.: 699,743

[52] U.S. Cl. .................................. 137/100; 137/117
[51] Int. Cl.² ........................................ G05D 11/00
[58] Field of Search .......................... 137/100, 117

[56] References Cited

UNITED STATES PATENTS

| | | | |
|---|---|---|---|
| 2,556,829 | 6/1951 | Teague, Jr. | 137/117 |
| 2,944,627 | 7/1960 | Skarstrom | 55/33 |
| 3,685,533 | 8/1972 | Krechel | 137/117 |

FOREIGN PATENTS OR APPLICATIONS

| | | | |
|---|---|---|---|
| 1,108,992 | 6/1958 | Germany | 137/117 |
| 1,453,783 | 4/1969 | Germany | 137/117 |

*Primary Examiner*—William R. Cline
*Assistant Examiner*—H. Jay Spiegel

[57] ABSTRACT

A proportioning valve is provided for volumetric proportioning of flow in an influent fluid line of the valve between two effluent fluid lines of the valve, particularly adapted for use in sensing main flow and adjusting purge flow in proportion to main flow in a twin-tank heatless or heat-reactivated adsorbent bed gas-fractionating apparatus, such as a desiccant bed dryer. The valve features two valve elements, each movable independently of the other, one sensing and responding to flow through one variable opening, and the other responding to and cooperating with the first in adjusting flow through a second variable opening, the first variable opening being in the influent fluid line of the valve, and the second variable opening being in one effluent fluid line of the valve, the first and second valve elements in combination controlling flow in the one effluent valve line at a desired volume and pressure in relation to pressure and flow in the influent valve line.

5 Claims, 4 Drawing Figures

PROPORTIONING VALVE FOR VOLUMETRIC PROPORTIONING OF FLOW

Skarstrom U.S. Pat. No. 2,944,627 patented July 12, 1960, discloses a twin bed desiccant dryer or other adsorbent bed gas-fractionating apparatus in which one desiccant or other adsorbent bed is off-stream and being regenerated while the other is on-stream. A proportion of the effluent gas flow from the bed on-stream is diverted as purge flow for regeneration of the spent bed, following which the purge flow normally is either vented to the atmosphere, or recycled.

The feature of this dryer or other gas-fractionating apparatus is the absence of heaters and other energy-consuming devices to regenerate the bed. Regeneration of the spent bed off-stream is carried out generally at a lower gas pressure than the adsorption on-stream. When this regeneration procedure is followed, a considerable proportion, up to approximately 10% of the total of the main gas flow, is lost in purge flow. However, in pressure-swing or constant-heat dryers, regeneration pressure may approach adsorption pressure, and when it does the proportion of purge flow to main flow approaches 100%. Increasing the purge flow temperature makes it possible to reduce the proportion of purge flow, as the saturation level of the purge flow increases.

It has been customary in the operation of twin bed adsorbent systems to fix the operating conditions at a predetermined time cycle, and switch the beds from on-stream to off-stream at the conclusion of the alloted time interval for each cycle. In this mode of operation, the proportion of purge flow is necessarily adjusted to the maximum required for the heaviest duty which the dryer will see, even though such duty may be infrequent. This however may be wasteful of purge flow because the extent of loading of the adsorbent bed on stream by the end of the time cycle of course depends upon the proportion of adsorbate, such as moisture, to be retained in the bed. It is frequently the case that this proportion is quite variable, so that a bed may not be fully consumed or spent before the end of the cycle. The use of more purge flow than is needed to regenerate a bed is of course wasteful of purge flow.

A more economical approach would be to adjust the proportion of purge flow according to the volume of effluent gas, so that if a high volume of gas is fed through the tank on-stream, a relatively high proportion of purge flow can be diverted for regeneration, while on the other hand if the main flow volume is small, the purge flow can be correspondingly reduced. In this way, the operation of the twin tank system can be better adpated to the actual operating conditions, as required for high removal efficiency and regeneration efficiency, without undue waste of the valuable effluent gas as purge flow.

In order to conserve purge flow, the proportioning must take into account not only the range of volumetric influent flow, but also the range of adsorption pressures. It has already been stated that the proportion of purge flow increases as purge pressure and adsorption pressure approach each other. However, the available proportioning valves are not adequate to adjust purge flow volumetrically in proportion to main flow and pressure ratio in a manner that ensures complete regeneration of a spent bed without waste of purge flow. The valves are complicated, with a multiplicity of parts in sensitive relationship to one another, such that faulty operation of the valve is virtually assured over an extended operating time. Since the failure of purge flow completely to regenerate a spent bed may lead to break-through of the adsorbate, so that effluent gas is not fully fractionated or freed from the component to be removed, unreliable or inaccurate valve performance cannot be tolerated over extended times in most systems.

In accordance with the invention, a proportioning valve for volumetric proportioning of flow is provided which eliminates many of the necessary working parts of prior valves, such as stabilization of valve element movement against a spring, or the dead weight of the valve element itself, or the need for variable linkages in valve element operations. The proportioning valve of the invention can be placed directly in the main gas stream, and utilizes influent volumetric flow and pressure to position the valve element in a manner to obtain a predetermined volumetric proportioning of flow at the same time as it compensates for pressure variations. Moreover, the valve element itself can be balanced between influent fluid pressure and the effluent fluid pressure, thus eliminating the dead weight of the valve element itself as a factor in operation of the valve. The proportioning valve of the invention is particularly adapted for controlling purge flow in proportion to volume of effluent flow from a desiccant bed dryer of the heatless type, as described in Skarstrom Pat. No. 2,944,627, but it is also applicable in any case where volumetric proportioning of gas or liquid flow in one fluid line between two fluid lines is required.

The proportioning valve in accordance with the invention comprises, in combination, a housing; a valve chamber; and influent flow passage and two effluent flow passages in the housing in fluid flow connection via the valve chamber; a first valve element interposed across the line of flow between influent and effluent flow passages in a manner to sense influent flow and apportion influent flow between the two effluent flow passages, and mounted in the valve chamber for movement between limiting positions and a multiplicity of intermediate pressure-balanced positions therebetween; the first valve element having a first pressure surface exposed to upstream fluid pressure in the influent flow passage tending to move the valve element in one direction; a second pressure surface exposed to downstream fluid pressure in the vave chamber, tending to move the valve element in the opposite direction; and a third pressure surface exposed to downstream fluid pressure in one effluent flow passage, tending to move the element in said opposite direction; the first valve element assuming a position with respect to the limiting positions responsive to influent volumetric flow, and in proportion to such flow and a balancing differential pressure-related force acting on the second and third pressure surfaces; the first valve element defining with side walls of the valve chamber a first variable opening for fluid flow into the chamber from the influent flow passage, the open area of said first opening available for flow being related to the valve position; the first valve element also defining with a wall of said one effluent line passage a second variable opening for fluid flow into the said passage from said chamber, the open area of said second opening available for flow being related to the valve position; the first valve element defining the opening size in proportion to volumetric flow in the influent line into the valve chamber; a second valve element movable independently of and cooperating with the first valve element in defining the size of the second variable opening; the second valve element having a first pressure surface exposed to upstream fluid pressure in the influent flow passage tending to move the valve element in one direction, and a second pressure surface exposed to downstream fluid pressure in the said one effluent line passage tending to move the valve in the opposite direction; bias means urging the second valve element in one direction, and resisting movement of the second valve element in the opposite direction, but permitting movement in that direction at pressures exceeding a predetermined minimum, in a manner such that its resistance to that movement increases as the valve element moves in that direction; the second valve element being movable against the bias means in response to a sufficient differential pressure between the influent passage and the said one effluent flow passage, to define the variable opening size in proportion to said differential pressure; the first and second valve elements in combination controlling flow in said one effluent flow passage at a desired volume and pressure in relation to pressure and flow in the influent flow passage.

In the preferred embodiment shown in the drawings, the first valve element is in the form of a piston, movable reciprocably in a bore or sleeve in the housing, the piston having at one end disposed in the valve chamber a disc of extended surface area having the first pressure surface on one side, and the second pressure surface on the other side, and having at the opposite end the third pressure surface exposed to downstream fluid pressure in the effluent line passage. The piston has a central passage therethrough leading from the valve chamber to the second variable opening, which is defined between a slot in the piston and an annular orifice in the housing bore or sleeve, and the first variable opening is defined between the periphery of the disc and the walls of the valve chamber, which walls preferably are shaped that the annular orifice defined therebetween increases or decreases as the disc moves between its limiting positions in the chamber.

In this embodiment, the second valve element is in the form of an annular piston, movable reciprocably in a bore or sleeve in the housing, and having a central bore or sleeve in which the first valve element is movable reciprocably. The bias means against which the second valve element moves is a system of two disc springs whose stiffness changes as they move in a space defined by the relative distance between the second valve element and the body of the valve chamber, their stiffness increasing as they move in one direction, and decreasing as they move in the other direction. One end of the sleeve defines one side of the annular orifice at the second variable opening, so that upon movement of the sleeve the orifice is increased or decreased in size.

A preferred embodiment of the valve in accordance with the invention is illustrated in the drawings, in which.

plotted against the differential pressure $P_1-P_3$ which causes the second valve element to move.

Figure 1:
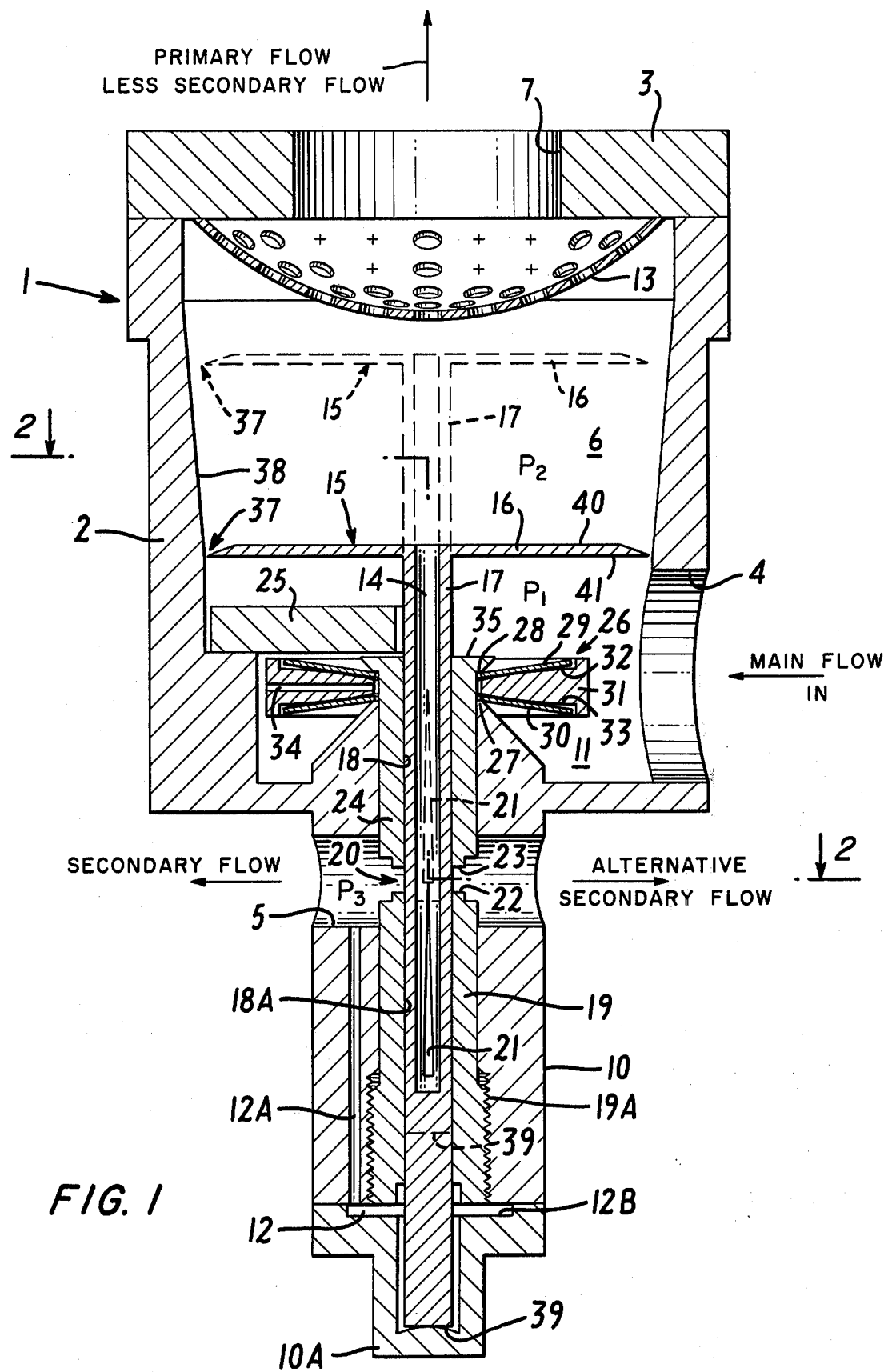
FIG. 1 represents a longitudinal sectional view through the proportioning valve of the invention.
Figure 2:
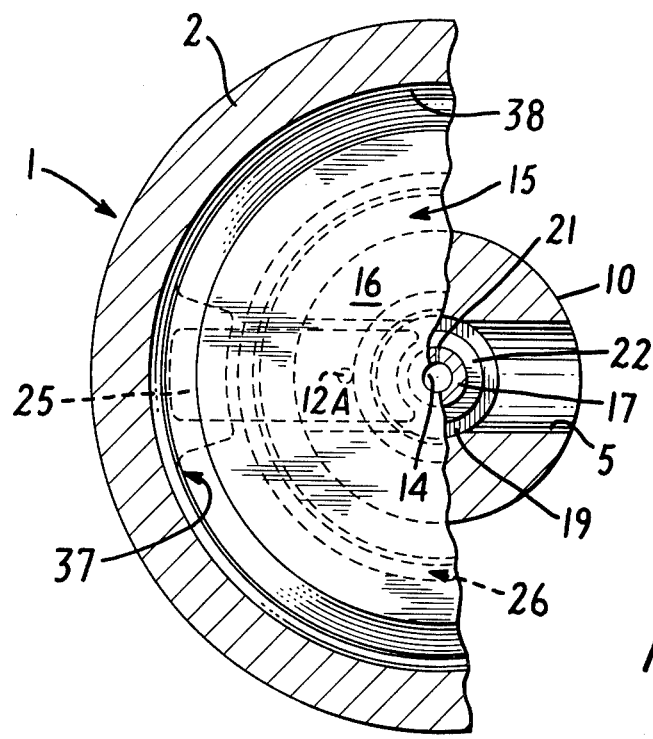
FIG. 2 is a cross-sectional view taken along the line 2—2 of FIG. 1 and looking in the direction of the arrows, showing the valve in the first limiting position, at minimum flow through the effluent line of FIG. 1.
Figure 3:
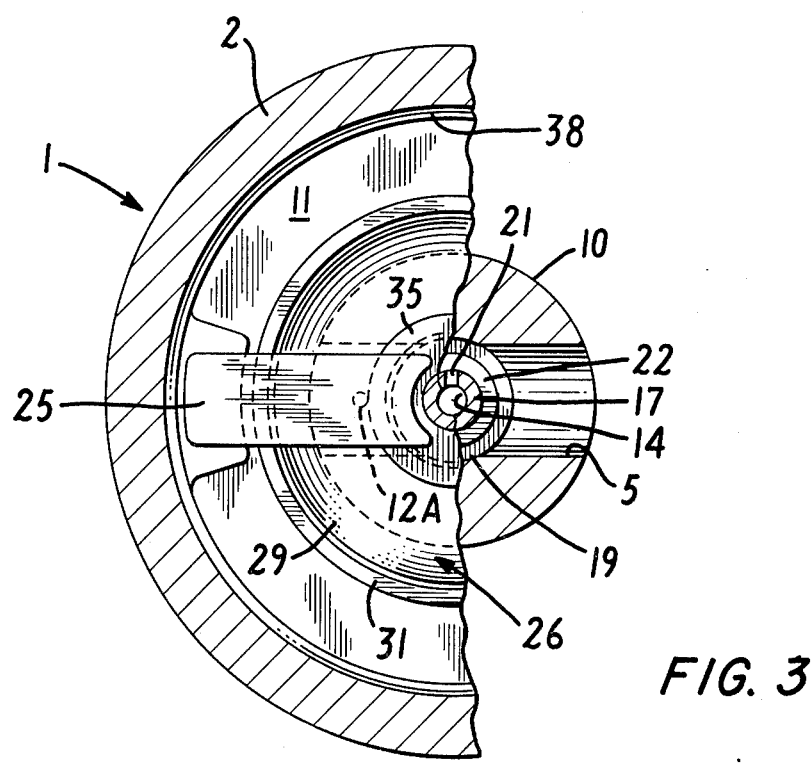
FIG. 3 is a cross-sectional view taken along the line 2—2 of FIG. 1 and looking in the direction of the arrows, showing the valve element in the other limiting position, represented in dashed lines in FIG. 1.
Figure 4:
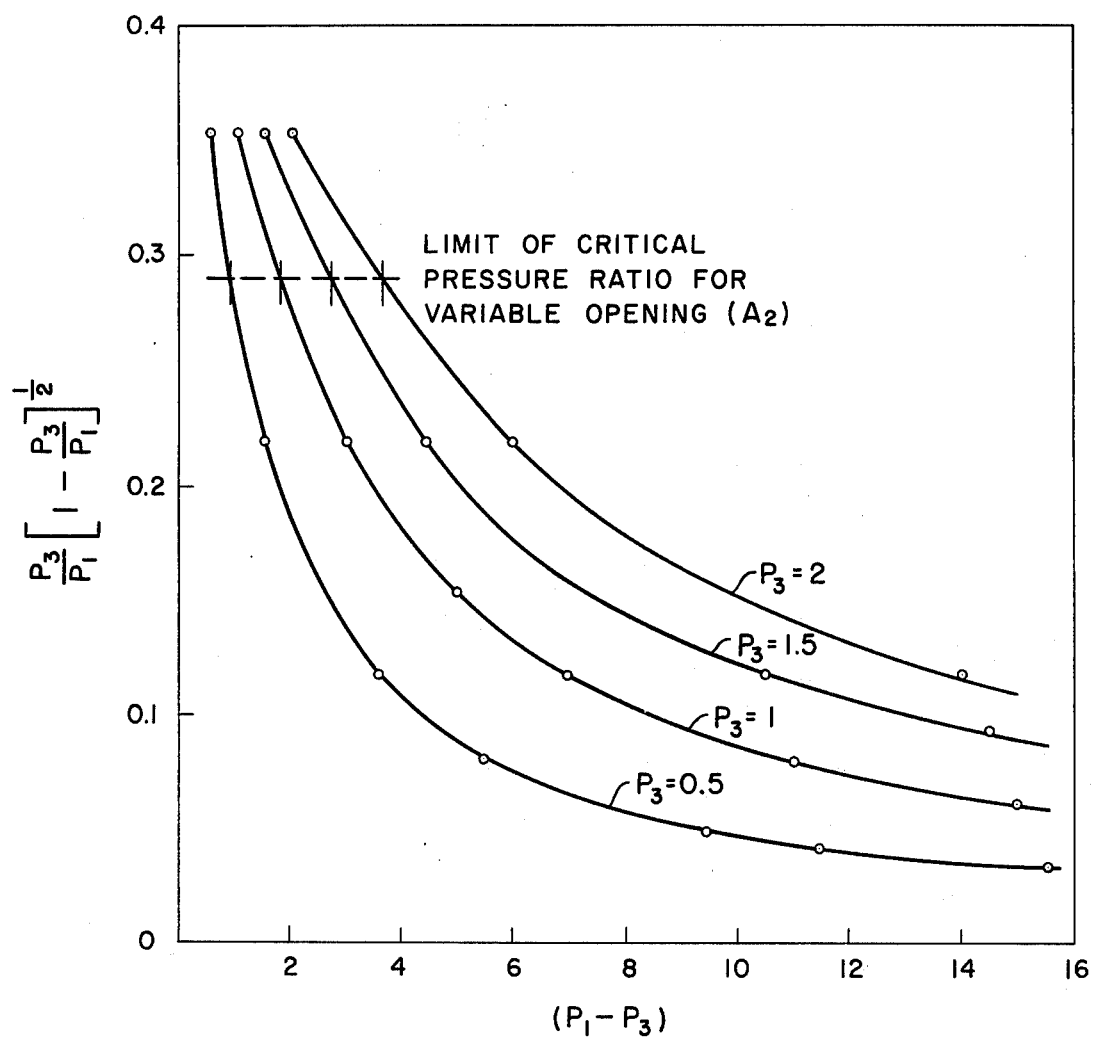
FIG. 4 is a graph showing the variable quantity $$\frac{P_3}{P_1} \cdot \left[1 - \frac{P_3}{P_1}\right]^{\frac{1}{2}}$$

The proportioning valve shown in FIG. 1 comprises a housing 1, made in this case of stainless steel but suitably of any metal or plastic material. The housing is in two parts, 2 and 3. Part 2 has an influent flow port 4, for connection to an effluent line (such as, for example, the effluent line from a heaterless dryer of the type shown in U.S. Pat. No. 2,944,627), and a second port 5 for effluent flow from the valve housing. The housing part 2 also defines the valve chamber 6. Housing part 2 is generally bowl-shaped, and its open end is closed off by the second housing part 3, which is attached thereto by screws (not shown), and housing part 3 has a second effluent port 7. In a heaterless dryer, port 4 would be connected to the effluent line from the desiccant beds, port 7 would constitute the main effluent port for effluent gas from the on-stream bed of the dryer, and port 5 would be connected to the purge flow line, for regeneration of the desiccant bed that is off-stream.

Integral with the housing part 2 is a central cylindrical portion 10, including at its inner end the port 5, and projecting inwardly into the valve chamber 6, reducing the chamber 6 to an annulus 11 in the portion in fluid communication with the influent port 4. At the outer end of cylindrical portion 10 is third part of the valve housing, part 10A, attached to portion 10 by screws (not shown) and forming an annular chamber 12, the outer wall 12B of which defines the lower limit of movement for the first valve element which is movable reciprocably within it, and the inner part of which is in fluid connection with port 5 by means of port 12A.

Projecting inwardly from the second housing part 3 is a flow distributor 13 which is perforated to permit fluid flow from chamber 6 to port 7, and the inner surface of which defines the upper limit of movement for the first valve element. The valve element 15 includes a flat disc portion 16, having on one side, exposed to upstream influent flow, pressure surface 41 and at the other side, exposed to downstream pressure in the valve chamber 6, pressure surface 40. The disc 15 and piston 17 move together in bores 18 and 18A as the valve disc moves into one or the other of the limiting positions shown in FIG. 1 or any intermediate position in between.

The disc 16 is attached to one end of a valve stem or piston 17, which is reciprocably mounted for axial movement in a central tubular bore 18 of annular piston 24 and bore 18A of annular sleeve 19, which is movable within threaded portion 19A and which engages with the outer end of portion 10. The piston 17 terminates as end area 39, acting as a pressure surface exposed to effluent flow fluid pressure at port 5.

Port 5 is in fluid communication with annular orifice 20 defined by end 22 of annular sleeve 19 and end 23 of annular piston 24, and with tapered slot 21 in the wall of valve stem 17 and the central passage 14 through the valve stem of the valve element 15.

The upward movement of annular piston 24 is limited by stop 25 which is attached by screws (not shown) to housing part 2.

A system of springs 26 is interposed between the inner end 27 of portion 10 and circumferential flange 28 of annular piston 24, the springs tending to push the annular piston against stop 25, but deflecting with increasing pressure differential across the annular piston to permit movement of annular piston 24 and enlarge or decrease annular orifice 20, according to the pressure differential.

The system of springs consists of two disc springs 29 and 30, separated axially along the annular piston 24 by spacer disc 31, and held against the spacer disc by narrow faces 28 and 27 located at the inside diameter of the springs. The rates of deflection of the spring system at any value of deflection can be increased by changing the contours of the upper face 32 and lower face 33 of the spacer disc, so that the support diameters of the discs change as they deflect. It will be noted that faces 32 and 33 are curved convexly away from the springs, to produce this varying rate effect. A small vent passage 34 is provided in the spacer disc, to equalize fluid pressure on both sides of each spring.

As has now been noted, the lower face 39 of the valve stem 17 is exposed to downstream pressure in the effluent line at port 5. The upper portion 40 of the valve disc 16 is exposed to downstream fluid pressure in the main part of the valve chamber 6, and the other face 41 of the disc 16 is exposed to influent fluid pressure in chamber portion 11, and influent line port 4. The surface 41 constitutes a first pressure surface of the first valve element, the surface 40 of a second pressure surface of the first valve element, and the surface 39 of a third pressure surface of the first valve element.

Similarly, the annular piston 24 has a first pressure surface 35, exposed to fluid pressure upstream in chamber portion 11, and a second pressure surface 23 exposed to downstream effluent line fluid pressure in port 5.

The first variable opening is orifice 37 and the second variable opening is defined by the intersection of annular orifice 20 and the width of tapered slot 21 which is determined by the position of stem 17.

It will be evident that influent line fluid pressure and fluid flow from chamber portion 11 to chamber portion 6 via the first variable opening, orifice 37, tend to thrust the valve disc 16 of valve element 15 and with it valve stem 17 towards the opposite side of the valve chamber 6, into the limiting position shown in dashed lines and which is defined by the stop 13. As the valve disc 16 and stem 17 are moved towards the stop 13, the portion of slot 21 exposed to the second variable opening, orifice 20, increases in size, thus increasing the open area available for flow and accordingly increasing the rate of effluent flow through effluent port 5.

At the same time as the valve disc 16 moves towards the stops 13, the orifice 37 alos increases in open area, because of the outward taper of the wall 38 of the chamber 6. Accordingly, the valve element 15 is self-adjusting, to accommodate increases in flow in the influent line. Correspondingly, as influent flow decreases, the valve element 15 retreats towards the limiting position in contact with valve part 10A shown in FIG. 1, reducing the size of orifice 37.

At the same time, the valve element 15 is fully pressure balanced, making it possible for it to assume any intermediate position required between the two limiting positions according to the volumetric flow in the influent line, because the differential pressure at surface 41 tending to move the valve 15 across chamber 6 towards stop 13 is balanced by a corresponding differential pressure across valve surface 40 and valve stem surface 39, reflecting differential pressure between chamber 6 and the effluent port 5, tending to move the valve across chamber 6 towards the lower limiting position. Thus, the pressure in chamber 6 is in effect cancelled out as a motive force, and the position assumed by the valve 15 in the chamber 6 is solely a function of the volumetric influent flow through orifice 37.

It will be apparent that when $P_3$ is constant and as the influent pressure increased, and, for example, doubles, the differential pressure $P_2$ minus $P_3$ across the orifice defined by the first and second valve elements at 20 and 21 is not correspondingly doubled, but is instead something more than this. Compensation therefore is required for this difference, and this compensation is provided for by the second valve element annular piston 24. The spring system restraining this element flexes inwards upon itself between faces 27 and 28 as differential pressure between chamber 11 and port 5 increases. As the spring system flexes, its points of contact with the curved faces 32 and 33 change, thus decreasing the ratio of bending moment to differential pressure. This is the means whereby a controllable variable stiffness rate for the spring is obtained for the purpose of modulating the annular orifice gap 20, and offsetting the increase in flow from effluent port 5 which would otherwise occur.

The result is that the first and second valve elements 15 and 24 in combination control flow at the effluent port 5 at any desired volume and pressure in relation to pressure and flow at the influent port 4. This adjustment can be obtained with reasonable accuracy by application of the following mathematical formulae, and subsequently refined by trial and error. The physical dimensions may be optimized to produce any desired performance characteristics.

This mathematical description of the proportioning valve assumes it is to be used to control purge of a heaterless dryer.

Let it be assumed that:

| | |
|---|---|
| Absolute pressure of influent gas | $=P_1$ |
| Absolute pressue of primary effluent gas | $=P_2$ |
| Absolute pressure of secondary effluent gas | $=P_3$ |
| Volumetric flow rate of influent gas at pressure $P_1$ | $=V_1$ |
| Volumetric flow rate of primary effluent gas at pressure $P_2$ | $=V_2$ |
| Volumetric flow rate of secondary effluent gas at pressure $P_3$ | $=V_3$ |
| Area of first variable opening | $=A_1$ |
| Area of second variable opening | $=A_2$ |

The description is based on the condition that $V_3$ shall equal $V_1$ when the ratio of $P_2/P_3$ exceeds the critical ratio for the gas flow through variable opening $A_2$. Temperature is assumed to be constant.

For the first variable opening:

$$(P_1 - P_2) = K_1 \cdot d_1 \cdot \left(\frac{V_1}{A_1}\right)^2 \tag{1}$$

where $K_1 =$ An overall coefficient of discharge for the first variable opening $A_1$, including physical unit conversion constants.

$d_1 =$ The density of the gas at pressure $P_1$

The force tending to move the first valve element in the same direction as the influent gas flow will be:

$$F_1 = P_1 \cdot B_1 - P_2 \cdot B_2 \qquad (2)$$

where $F_1$ = The force.
$B_1$ = The first surface area acted on by $P_1$
$B_2$ = The second surface area acted on by $P_2$
But by design $B_1 = B_2$ $$\text{Then, } F_1 = (P_1 - P_2) \cdot B_1 \qquad (3)$$

For equilibrium force $F_1$ is balanced by an equal and opposite force provided by the differential pressure $P_2 - P_3$ acting on the third surface area $B_3$ of the first valve element so that:

$$(P_1 - P_2) \cdot B_1 = (P_2 - P_3) \cdot B_3 \qquad (4)$$

Substituting for $(P_1 - P_2)$ in terms of flow rate $(V_1)$:

$$K_1 \cdot d_1 \cdot \left(\frac{V_1}{A_1}\right)^2 \cdot B_1 = (P_2 - P_3) \cdot B_3$$

or, $$V_1 = A_1 \cdot \left[\frac{(P_2 - P_3) \cdot B_3}{K_1 \cdot d_1 \cdot B_1}\right]^{1/2} \qquad (5)$$

since $P_3/P_2$ exceeds the critical ratio for the gas then flow through the second variable opening is expressed by:

$$V_3 = A_2 \cdot P_2 \cdot K_2/d_3 \qquad (6)$$

where $K_2$ = An overall coefficient of discharge for the second variable opening $A_2$, including physical unit conversion constants.

$d_3$ = The density of the gas at pressure $P_3$.
But by design $V_1 = V_3$ Therefore combining equations 5 and 6

$$A_1 \cdot \left[\frac{(P_2 - P_3) \cdot B_3}{K_1 \cdot d_1 \cdot B_1}\right]^{1/2} = \frac{A_2 \cdot P_2 \cdot K_2}{d_3} \qquad (7)$$

Now let $(P_1 - P_2)$ be small so that $P_1 = P_2$ in equation 6. Also let $d_1 = C_1 \cdot P_1$ and $d_3 = C_3 \cdot P_3$ where $C_1$ and $C_3$ are constants. These constants are combined as follows:

$$K = \frac{C_3}{K_2} \cdot \left[\frac{B_3}{K_1 \cdot C_1 \cdot B_1}\right]^{1/2} \qquad (8)$$

Then simplifying 7, $$K \cdot A_1 \cdot \left[\frac{P_1 - P_3}{P_1}\right]^{1/2} = A_2 \cdot \frac{P_1}{P_3} \qquad (9)$$

the second variable opening of the valve is defined by two dimensions, $x$ and $y$. $x$ is determined by the position of the first valve element and $y$ is deteremined by the position of the second value element so that $A_2 = x \cdot y$ and when $x$ is proportional to $A_1$ then $x = K_3 \cdot A_1$ where $K_3$ is constant.

$$A_2 = K_3 \cdot A_1 \cdot y \qquad (10)$$

Substituting for $A_2$ in equation 9:

$$K \cdot A_1 \cdot \left[\frac{P_1 - P_3}{P_1}\right]^{1/2} = K_3 \cdot A_1 \cdot y \cdot \frac{P_1}{P_3} \qquad (11)$$

or $$y \approx \frac{K}{K_3} \cdot \frac{P_3}{P_1}\left[1 - \frac{P_3}{P_1}\right]^{1/2} \qquad (12)$$

The graph Figure shows the variable quantity plotted against the differential pressure $(P_1 - P_3)$ which causes the second valve element to move.

The extremes of movement are such that the correct values of $y$ occur at the maximum and minimum values of $(P_1 - P_3)$ and $y$ follows the form of the graph at intermediate values. Since the second valve element position is not important at lesser or greater values of $(P_1 - P_3)$ it is simplest to allow it to reach an "at-rest" position when $(P_1 - P_3) = 0$ although it may also be preloaded to the minimum design value of $(P_1 - P_3)$. Similarly the use of suitable limiting stops can prevent it from exceeding a maximum movement according to the maximum design value of $(P_1 - P_3)$.

Various spring arrangements have been used to obtain the relationships shown in the graph. Two disc springs each with linear characteristics may be combined to produce a non-linear movement which closely approximates the desired form. In the example illustrated here a single flat disc spring is supported so that as it deflects the diameter of its support decreases making it stiffer. This produces a continuously variable spring rate. By suitable contouring of the spring support the movement of the second valve element is matched to the form of the graph.

Having regard to the foregoing disclosure, the following is claimed as inventive and patentable embodiments thereof:

1. A proportioning valve for volumetric proportioning of flow in an influent fluid line between two effluent fluid lines, comprising, in combination, a housing; valve chamber; an influent flow passage and two effluent flow passages in the housing in fluid flow connection via the valve chamber; a first valve element interposed across the line of flow between influent and effluent flow passages in a manner to sense influent flow and apportion influent flow between the two effluent flow passages, and mounted in the valve chamber for movement between limiting positions and a multiplicity of intermediate pressure-balanced positions therebetween; the first valve element having a first pressure surface exposed to upstream fluid pressure in the influent flow passage tending to move the valve element in one direction; a second pressure surface exposed to downstream fluid pressure in the valve chamber, tending to move the valve element in the opposite direction; and a third pressure surface exposed to downstream fluid pressure in one effluent flow passage tending to move the element in said opposite direction; the first valve element assuming a position with respect to the limiting positions responsive to influent volumetric flow, and in proportion to such flow and a balancing differential pressure-related force acting on the second and third pressure surfaces; the first valve element defining with side walls of the valve chamber a first variable opening for fluid flow into the chamber from the influent flow passage, the open area of said first opening available for flow being related to the valve position, the first valve element also defining with a wall of said one effluent line passage a second variable opening for fluid flow into the said passage from said chamber, the open area of said second opening available for flow being related to the valve position; the first valve element defining the opening size in proportion to volumetric flow in the influent line into the valve chamber; a second valve element movable independently of and cooperating with the first valve element in defining the size of the second variable opening; the second valve element having a first pressure surface exposed to upstream fluid pressure in the influent flow passage tending to move the valve element in one direction, and a second pressure surface exposed to downstream fluid pressure in the said one effluent line passage tending to move the valve in the opposite direction; bias means urging the second valve element in one direction, and resisting movement of the second valve element in the opposite direction, but permitting movement in that direction at pressures exceeding a predetermined minimum, in a manner such that its resistance to that movement increases as the valve element moves in that direction; the second valve element being movable against the bias means in response to a sufficient differential pressure between the influent passage and the said one effluent flow passage, to define the variable opening size in response to said differential pressure, the first and second valve elements in combination controlling flow in said one effluent flow passage at a desired volume and pressure in relation to pressure and flow in the influent flow passage.

2. A proportioning valve according to claim 1, in which the first valve element comprises a disc affording on one side a first pressure surface and on the other side a second pressure surface, with the outer periphery of the valve disc defining the first variable opening with the wall of the valve chamber, and the wall of the valve chamber being tapered so that the size of the first variable opening varies according to the position of the valve disc in the valve chamber; a valve stem having the disc attached to one end and having a third pressure surface at the other end thereof, the valve stem having a central passage therethrough, and a variable width slot communicating the central passage with the second variable opening; the valve stem being reciprocably and slidably mounted in a bore in the housing with the variable width slot registering with an opening in the bore according to the position of the valve stem in the bore.

3. A proportioning valve according to claim 1, in which the bias means for the second valve element is in the form of an annular spring disc, in contact at its outer periphery with a convexly-curved seat, so shaped that flexing of the annular disc outwardly in the direction of the curved seat moves the point of contact of the disc with the seat inwardly of the disc towards its center, thus increasing the stiffness of the annular spring disc.

4. A proportioning valve according to claim 3, in which the inner periphery of the annular spring disc is flexibly seated against a movable member defining one wall of the second variable opening, so that movement of the inner periphery of the valve disc moves the member in a manner to vary the size of the variable opening.

5. A proportioning valve according to claim 4, in which the first valve element comprises a disc affording on one side a first pressure surface and on the other side a second pressure surface, with the outer periphery of the valve disc defining the first variable opening with the wall of the valve chamber, and the wall of the valve chamber being tapered so that the size of the first variable opening varies according to the position of the valve disc in the valve chamber; a valve stem having the disc attached to one end and having a third pressure surface at the other end thereof, the valve stem having a central passage therethrough, and a variable width slot communicating the central passage with the second variable opening, the valve stem being reciprocably and slidably mounted in a bore in the housing with the variable width slot registering with an opening in the bore according to the position of the valve stem in the bore, and the movable member of the second valve element is a sleeve reciprocably movable along the valve stem, one end of the sleeve defining one side of the variable opening.

* * * * *

UNITED STATES PATENT OFFICE
CERTIFICATE OF CORRECTION

Patent No. 4,033,371             Dated July 5, 1977

Inventor(s) Cyril A. Keedwell

It is certified that error appears in the above-identified patent and that said Letters Patent are hereby corrected as shown below:

Column 2, line 35, "and" first occurrence should be --an--.
           line 48, "vave" should be --valve--.
Column 5, line 58, "alos" should be --also--.
Column 7, line 34, "$V_3 = A_2 \cdot P_2 \cdot K_2/d_3$" should be $-- V_3 = \dfrac{A_2 \cdot P_2 \cdot K_2}{d_3} --$.

Signed and Sealed this

Fourth Day of July 1978

[SEAL]

Attest:

RUTH C. MASON
*Attesting Officer*

DONALD W. BANNER
*Commissioner of Patents and Trademarks*